United States Patent

[11] 3,627,755

| [72] | Inventors | Paul D. Klimstra<br>Northbrook;<br>Charles S. Markos, Skokie, both of Ill. |
|---|---|---|
| [21] | Appl. No. | 771,640 |
| [22] | Filed | Oct. 29, 1968 |
| [45] | Patented | Dec. 14, 1971 |
| [73] | Assignee | G. D. Searle & Co.<br>Chicago, Ill. |

[54] (OPTIONALLY 17-ALKYLATED) 2α, 3α-EPOXY-ANDROSTANE-11β,17β-DIOLS, 19-NOR DERIVATIVES CORRESPONDING AND ESTERS THEREOF
10 Claims, No Drawings

[52] U.S. Cl....................................260/239.55, 424/241
[51] Int. Cl......................................C07c 173/00
[50] Field of Search............................260/239.55; /Machine Searched Steroids

[56] References Cited
UNITED STATES PATENTS
3,225,034  12/1965  Hewett et al................  260/239.5

Primary Examiner—Henry A. French
Attorneys—John M. Brown, John J. Kolano, Elliot N. Schubert, Helmuth A. Wegner and Walter C. Ramm ABSTRACT: 11β,17β-Bisoxygenated Δ$^2$-steroids of the androstane and estrane families are contacted with a suitable epoxidizing agent to afford the corresponding 2α,3α-epoxides, which are useful pharmacological agents as evidenced by their antihormonal properties, e.g. antiestrogenic, antifertility, antidesoxycorticosterone acetate.

(OPTIONALLY 17-ALKYLATED) 2α, 3α-EPOXY-ANDROSTANE-11β,17β-DIOLS, 19-NOR DERIVATIVES CORRESPONDING AND ESTERS THEREOF

The present invention is concerned with novel steroidal epoxides of the androstane and estrane families and, more particularly, with (optionally 17-alkylated) 2α,-3α-epoxy-5α androstane-11β-diols, 19-nor derivatives corresponding and esters thereof represented by the following structural formula

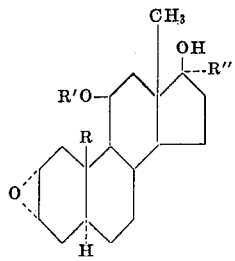

wherein R can be hydrogen or methyl radical, R' is hydrogen or a lower alkanoyl radical and R'' is hydrogen or a lower alkyl radical.

The lower alkyl radicals denoted by R'' in the foregoing structural representation are typified by methyl, ethyl, propyl, butyl, pentyl, hexyl, heptyl and the branched-chain groups isomeric therewith.

Specific examples of the lower alkanoyl radicals encompassed by the R' term are formyl, acetyl, propionyl, butyryl, valeryl, caproyl, heptanoyl and the branched-chain isomers thereof.

The 2,3-dehydro compounds of the following structural formula

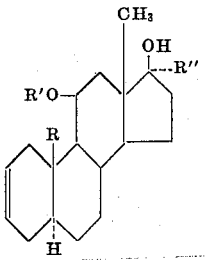

wherein R, R' and R'' are as hereinbefore defined, are convenient starting materials for the manufacture of the compounds of the present invention. Those starting materials and methods for their manufacture are described in U.S. Pat. No. 3,338,929 and in French Pat. No. 2913 M.

The instant 2α,3α-epoxides are produced when the aforementioned starting materials are contacted with a suitable epoxidizing agent, e.g. a peracid such as peracetic, perbenzoic, m-chloroperbenzoic, perphthalic, in a suitable inert organic solvent. A specific example of that process is the reaction of 17α-methyl-5α-estr-2-ene-11β,17β-diol in chloroform with m-chloroperbenzoic acid to afford 2α,3α-epoxy-17α-methyl-5α-estrane-11β,17β-diol.

The compounds of this invention exhibit valuable pharmacological properties. They are, for example, antihormonal agents as is evidenced by their antiestrogenic, antifertility and antidesoxycorticosterone acetate activity.

The antihormonal properties of the instant compounds are specifically illustrated by the antiestrogenic activity of 2α,3α-epoxy-17α-methyl-5α-androstane-11β,17β-diol, the antifertility activity of 2α,3α-epoxy-17α-methyl-5α-estrane-11β,17β-diol 11-acetate and the antidesoxycorticosterone acetate activity of 2α,3α-epoxy-17α-methyl-5α-estrane-11β,17β-diol as determined by testing in the assays described hereinafter.

The assay used for the determination of antiestrogenic activity is that disclosed by Edgren and Calhoun, Proc. Soc. Exp. Biol. Med., 94, 537 (1957) and is described as follows:

Groups of eight to 10 immature female mice are injected once daily for a period of 3 days with 0.1 ml. of a corn oil solution containing 0.1 mcg. of estrone together with one-third of the selected dose of the test compound. Twenty-four hours after the final injection the animals are sacrificed and their uteri are removed, cleaned and weighed. The uterine weights are compared with those of a similar group of control animals receiving injections of corn oil containing the same dose of estrone alone. A compound is designated active if it produces a uterine response significantly smaller ($P \leq 0.01$) than control values. Potency is expressed in terms of percentage of activity of the standard, i.e. progesterone.

For the determination of antifertility activity the method substantially described by Edgren et al., Fertility and Sterility, 12, 172 (1961) was used. In that assay a group of five sexually mature female rats, weighing approximately 190 grams each, is mated and, beginning on the first day that sperm appears in the vagina, is injected once daily for 7 days with the selected dose of the test compound dissolved or suspended in 0.1 ml. of corn oil. A dose of 4 mg. is normally employed. During the same period of time a group of control rats is injected with corn oil alone. On the 15th day after commencement of treatment the animals are sacrificed and the uteri are inspected for placentation sites. A rat exhibiting one or more normal appearing placentation sites is classified as pregnant. A compound is designated active if it inhibits pregnancy in at least 50 percent of the rats.

The procedure used for the determination of antidesoxycorticosterone acetate activity is a standardized modification of the method disclosed by C. M. Kagawa, Endocrinology, 67, 125 (1960) and is described as follows:

A group of eight male rats weighting between 100 and 175 grams is adrenalectomized and maintained thereafter on sugar cubes and tap water ad libitum for approximately 24 hours. The animals are then treated successively with the following subcutaneous injections: (1) 0.009 mg. of desoxycorticosterone acetate dissolved in 0.1 ml. of corn oil, (2) the selected dose of the test compound dissolved in 0.5 ml. of corn oil and (3) 2.5 ml. of 0.85 percent aqueous sodium chloride. A 2.4 mg. dose of the test compound is normally employed. Urinary sodium and potassium are measured by standard techniques on samples of urine collected during the 4 hours immediately following treatment. The results are compared with those obtained from two groups of control animals, wherein the first group is treated as above save for omission of the test compound and, in the second group, spironolactone is substituted for the test compound. A test compound's activity is expressed in terms of a minimum effective dose, at which dose there occurs a 50 percent blockade of the renal effects of desoxycorticosterone acetate, the parameter being the reduction in the urinary log $(Na \times 10)/K$ ratio induced by desoxycorticosterone acetate. A 50 percent blockade (minimum effective dose) by the test compound is evidenced by a log $(Na \times 10)/K$ ratio response equal to that produced by 0.33 mg. of spironolactone.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples temperatures are given in degrees centigrade and quantities of materials in parts by weight unless otherwise noted.

EXAMPLE 1

To a solution of 14.5 parts of 17α-methyl-5α-estr-2-ene-11β,17β-diol in 750 parts of chloroform is added, with stirring and cooling by means of a cold water bath, 11.5 parts of m-chloroperbenzoic acid. The reaction mixture is stirred for about 30 minutes, at the end of which time 13 parts of calcium hydroxide is added and the mixture is stirred for about 20 minutes longer. The precipitated solid is collected by filtration and washed on the filter with chloroform. The combined filtrate and washings are stripped of solvent by distillation under reduced pressure and the resulting residue is purified by recrystallization from ethyl acetate to afford 2α,3α-epoxy-17α-methyle5α-estrane-11β,17β-diol, melting at about 251°–254°. This compound is represented by the following structural formula

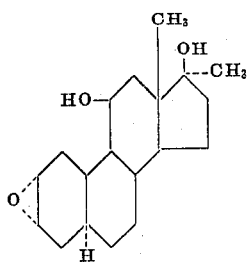

EXAMPLE 2

When an equivalent quantity of 17α-ethyl-5α-estr-2-ene-11β17β-diol is substituted in the procedure of example 1, there is obtained 2α,3α-epoxy-17α-ethyl-5α-estrane-11β,17β-diol.

EXAMPLE 3

A mixture containing 8 parts of 17α-methyl-5α-estr-2-ene-11β,17β-diol, 80 parts of acetic anhydride and 160 parts of pyridine is stored at room temperature for about 16 hours, then is poured carefully into a mixture of ice and water. The resulting precipitate is collected by filtration, washed with water and purified by recrystallization from aqueous methanol, thus affording 17α-methyl-5α-estr-2-ene-11β,17β-diol 11-acetate, melting at about 155°–159°. Additional product is obtained by chromatography on silica gel and elution with 10 percent ethyl acetate in benzene of the material obtained from the mother liquors of the aqueous methanol recrystallization.

A mixture containing 3.1 parts of 17α-methyl-5α-estr-2-ene-11β,17β-diol 11-acetate, 2.2 parts of m-chloroperbenzoic acid and 150 parts of chloroform is stirred about room temperature for about 20 minutes. At the end of that reaction period, 3 parts of calcium hydroxide is added and the mixture is stirred for about 20 minutes. The resulting precipitate is removed by filtration and the filtrate is concentrated to dryness to afford an oily residue, which solidifies upon standing. Recrystallization of that crude product from methanol affords 2αm3α17α-methyl-5α-estrane-11β,17β-diol 11-acetate, melting at about 152°–153°. This compound is represented by the following structural formula

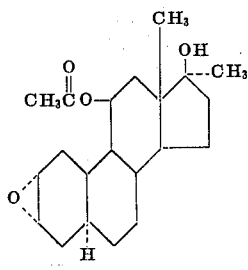

EXAMPLE 4

By substituting an equivalent quantity of propionic anhydride in the procedure of example 3, there is produced 17α-methyl-5α-estr-2-ene-11β,17β-diol 11-propionate, which, upon epoxidation according to the procedure of that example, affords 2α,3α-epoxy-17α-methyl-5α-estrane-11β,17β-diol 11-propionate.

EXAMPLE 5

To a solution of 1.02 parts of 17α-methyl-5α-androst-2-ene-11β,17β-diol in 22.5 parts of chloroform is added dropwise, with cooling and stirring, a solution of 1.05 parts of m-chloroperbenzoic acid in 22.5 parts of chloroform. The reaction mixture is then stirred at room temperature for about 2 hours, at the end of which time 1 part of calcium hydroxide is added and stirring is continued for approximately 16 hours longer. Filtration of that mixture affords an organic solution, which is concentrated to dryness under reduced pressure to afford the solid crude product. Purification of that material is effected by recrystallization from aqueous methanol to yield needlelike crystals of 2α,3α-epoxy-17α-methyl-5α-androstane-11β,17β -diol, melting at about 219°–221° and characterized also by an optical rotation of +24°. It is represented by the following structural formula

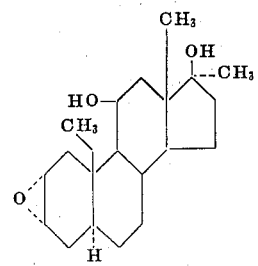

EXAMPLE 6

When an equivalent quantity of 17α-ethy'-5α-androst-2-ene-11β,17β-diol is substituted in the procedure of example 5, there is obtained 2α,3α-epoxy-17**-ethyl-5α-androstane-11β,17β-diol.

EXAMPLE 7

When an equivalent quantity of 17α-methyl-5α-androst-2-ene-11β,17β-diol is acetylated by the procedure of example 3, there is produced 17α-methyl-5α-androst-2-ene-11β,17β-diol 11-acetate.

The epoxidation of an equivalent quantity of 17α-methyl-5α-androst-2-ene-11β,17β-diol 11-acetate by the procedure described in example 3 results in 2α,3α-epoxy-17α-methyl-5α-androstane-11β,17β-diol 11-acetate.

EXAMPLE 8

The reaction of equivalent quantities of 17α-methyl-5α-androst-2-ene-11β,17β-diol and propionic anhydride by the procedure described in example 3 results in 17α-methyl-5α-androst-2-ene-11β,17β-diol 11-propionate.

When an equivalent quantity of 17α-methyl-5α-androst-2-ene-11β,17β-diol 11-propionate is substituted in the procedure of example 3, there is produced 2α,3α-epoxy-17α-methyl-5α-androstane-11β,17β-diol 11-propionate.

EXAMPLE 9

When an equivalent quantity of 5α-estr-2-ene-11β,17β-diol is substituted in the procedure of example 1, there is produced 2α,3α-epoxy-5α-estrane-11β,17β-diol.

EXAMPLE 10

To a solution of 10 parts of 11β-hydroxyandrost-4-ene-3,17-dione in 225 parts of tetrahydrofuran, cooled to approximately 0°, is added 35 parts of lithium tri(tertiary-butoxy) aluminum hydride and the resulting reaction mixture is stirred for about 3 hours, during which time the temperature is maintained below 10°. At the end of that reaction period the mixture is poured onto an ice-water mixture containing excess acetic acid. The resulting precipitated product is collected by filtration, washed on the filter with water and dried in air to afford androst-4-ene-3β,11β17β-triol, which compound is characterized by infrared absorption maxima, in chloroform, at about 2.75, 3.42 and 6.05 microns.

To a solution of nine parts of androst-4-ene-3β,-11β,17β-triol in 240 parts of isopropyl alcohol is added 80 parts of finely divided manganese dioxide and that mixture is stirred at room temperature for about 48 hours. The inorganic salts are then removed by filtration and the filter cake is washed with isopropyl alcohol. The combined filtrate and washings are evaporated to dryness under reduced pressure to yield 11β,17β4-en-3-one, which displays infrared absorption maxima, in chloroform, at about 2.75, 3.41, 5.95 and 6.08 microns.

To a mixture of 210 parts of liquid ammonia with 90 parts of tetrahydrofuran is added successively 1.2 parts of lithium metal and a solution of 8.5 parts of 11β,17β-dihydroxyandrost-4-en-3-one in 180 parts of tetrahydrofuran. The reaction mixture is stirred for about 15 minutes, during which time the initial blue color changes to bronze. At the end of that reaction period, 15 parts of ammonium chloride is added, the ammonia is evaporated and the resulting residual mixture is diluted with approximately 140 parts of ether and 100 parts of water. That two-phase system is stirred and the ether layer is then separated, washed with water, dried over anhydrous sodium sulfate containing decolorizing carbon and stripped of solvent by distillation under reduced pressure. The resulting product is 11β,17β-dihydroxy-5α-androstan-3-one, which displays infrared absorption peaks, in chloroform, at about 2.75, 3.40 and 5.85 microns.

To a solution of 7.8 parts of 11β,17β-dihydroxy-5α-androstan-3-one in 160 parts of ethanol is added 7.5 parts of p-toluenesulfonylhydrazine and 1.4 parts of concentrated hydrochloric acid and that reaction mixture is heated at the reflux temperature for about 1 hour. Concentration of the mixture to approximately one-half volume followed by dilution with water results in precipitation of the crude product, which is collected by filtration and purified by recrystallization from aqueous methanol, thus affording 11β,17β-dihydroxy-5α-androstan-3-one p-toluenesulfonylhydrazone.

A mixture containing 8.6 parts of 11β,17β-dihydroxy-5α-androstan-3-one p-toluenesulfonylhydrazone, 12 parts of lithium aluminum hydride and 200 parts of dioxane is heated at the reflux temperature for about 24 hours, then is cooled and diluted successively with 12 parts of water, 25 parts of dioxane, 9.5 parts by volume of 20 percent aqueous sodium hydroxide and 41 parts of water. The resulting precipitated salts are removed by filtration and washed on the filter with tetrahydrofuran. Evaporation of dryness of the combined filtrate and washings affords the crude product, which is purified by chromatography on silica gel and elution with 25 percent ethyl acetate in benzene, thus affording 5α-androst-2-ene-11β,17βabout 2.75, 3.42 and 6.02 microns.

When an equivalent quantity of 5α-androst-2-ene-11β,17β-diol is substituted in the procedure of example 1, there is produced 2α,3**-epoxy-5α-androstane-11β,17β-diol.

EXAMPLE 11

By substituting an equivalent quantity of 5α-estr-2-ene-11β, 17β-diol 11-acetate and otherwise proceeding according to the processes described in example 1, there is obtained 2α,3α-epoxy-5α-estrane-11β,17β-diol 11-acetate.

What is claimed is:

1. A compound of the formula

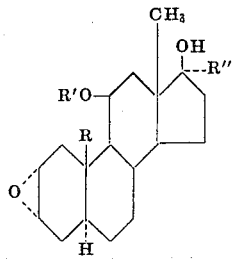

wherein R is selected from the group consisting of hydrogen and methyl, R' is a member of the class consisting of hydrogen and lower alkanoyl and R'' is a member of the class consisting of hydrogen and lower alkyl.

2. As in claim 1, a compound of the formula

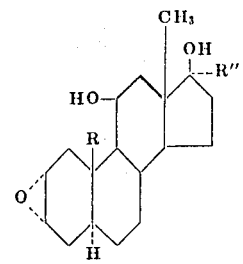

wherein R is selected from the group consisting of hydrogen and methyl and R'' is a member of the class consisting of hydrogen and lower alkyl.

3. As in claim 1, a compound of formula

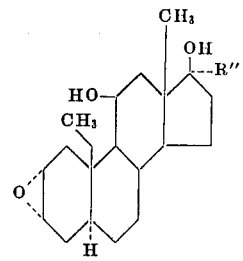

wherein R'' is a member of the class consisting of hydrogen and lower alkyl.

4. As in claim 1, a compound of the formula

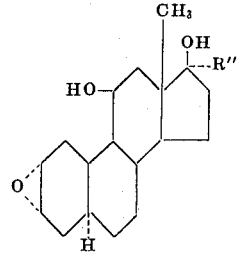

wherein R'' is a member of the class consisting of hydrogen and lower alkyl.

5. As in claim 1, a compound of the formula

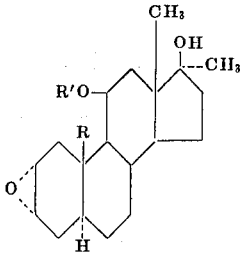

wherein R is selected from the group consisting of hydrogen and methyl and R' is a member of the class consisting of hydrogen and lower alkanoyl.

6. As in claim 1, a compound of the formula

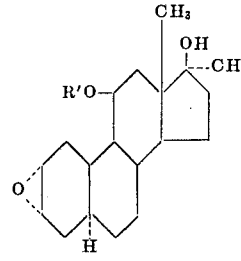

wherein R' is a member of the class consisting of hydrogen and lower alkanoyl.

7. As in claim 1, a compound of the formula

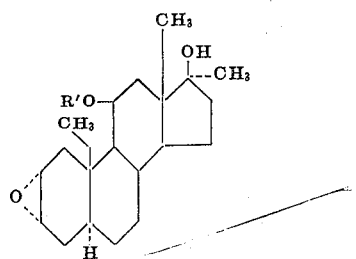

wherein R' is a member of the class consisting of hydrogen and lower alkanoyl.

8. A compound according to claim 1, wherein R and R' are hydrogen and R'' is methyl, that compound being 2α,3α-epoxy-17α-methyl-5α-estrane-11β,17β-diol.

9. A compound according to claim 1, wherein R is hydrogen, R' is acetyl and R'' is methyl, that compound being 2α,3α-epoxy-17α-methyl-5α-estrane-11β,17β-diol 11-acetate.

10. A compound according to claim 1, wherein R and R'' are methyl and R'' is hydrogen, that compound being 2α,3α-epoxy-17α-methyl-5α-androstane-11β,17β-diol.

* * * * *

PO-1050
(5/69)

UNITED STATES PATENT OFFICE
CERTIFICATE OF CORRECTION

Patent No. 3,627,755            Dated December 14, 1971

Inventor(s) Paul D. Klimstra and Charles S. Markos

It is certified that error appears in the above-identified patent and that said Letters Patent are hereby corrected as shown below:

Column 8, line 12, "R" " should be -- R' --.

Signed and sealed this 13th day of June 1972.

(SEAL)
Attest:

EDWARD M. FLETCHER, JR.
Attesting Officer

ROBERT GOTTSCHALK
Commissioner of Patents